(12) United States Patent
Brunone

(10) Patent No.: US 11,919,730 B2
(45) Date of Patent: Mar. 5, 2024

(54) DEVICE FOR UNLOADING A VEHICLE TRANSPORTING BULK MATERIAL, ASSOCIATED ASSEMBLY AND METHOD

(71) Applicant: René Brunone, Saint-Marcel (FR)

(72) Inventor: René Brunone, Saint-Marcel (FR)

( * ) Notice: Subject to any disclaimer, the term of this patent is extended or adjusted under 35 U.S.C. 154(b) by 0 days.

(21) Appl. No.: 17/805,827

(22) Filed: Jun. 7, 2022

(65) Prior Publication Data

US 2022/0396442 A1 Dec. 15, 2022

(30) Foreign Application Priority Data

Jun. 9, 2021 (FR) .................................. 21 06077

(51) Int. Cl.
*B65G 47/18* (2006.01)
*B65G 67/24* (2006.01)

(52) U.S. Cl.
CPC ............. *B65G 67/24* (2013.01); *B65G 47/18* (2013.01)

(58) Field of Classification Search
CPC ................................. B65G 47/18; B65G 67/24
USPC .................................................. 198/311, 582
See application file for complete search history.

(56) References Cited

U.S. PATENT DOCUMENTS

| | | | |
|---|---|---|---|
| 3,064,832 A | 11/1962 | Heltzel | |
| 3,154,202 A | 10/1964 | Heltzel | |
| 3,378,152 A * | 4/1968 | Warner | B65G 47/18 |
| | | | 414/350 |
| 4,350,241 A * | 9/1982 | Wenzel | B65G 67/24 |
| | | | 198/318 |
| 4,792,234 A * | 12/1988 | Doherty | B28C 9/0454 |
| | | | 366/14 |
| 6,471,031 B1 * | 10/2002 | Duncalf | B65G 67/24 |
| | | | 198/313 |
| 9,676,554 B2 * | 6/2017 | Glynn | B65G 47/19 |
| 9,975,712 B2 * | 5/2018 | Friesen | B60P 1/36 |
| 10,542,677 B1 * | 1/2020 | Kringstad | A01D 33/08 |
| 10,683,178 B2 * | 6/2020 | Lanoue | B01D 33/0346 |
| 10,759,610 B1 * | 9/2020 | Allegretti | B65G 47/16 |

FOREIGN PATENT DOCUMENTS

| | | |
|---|---|---|
| CN | 209922471 U | 1/2020 |
| DE | 10259198 A1 | 7/2004 |
| EP | 0060966 A1 | 9/1982 |

OTHER PUBLICATIONS

US 2007/0295581 A1, Ash, Dec. 27, 2007.*
US 2009/0038242 A1, Cope, Feb. 12, 2009.*
US 2021/0339962 A1, Weiler et al., Nov. 4, 2021.*
French Search Report for French Patent Application No. FR2106077, dated Feb. 23, 2022 in 2 pages.

* cited by examiner

*Primary Examiner* — Douglas A Hess

(74) *Attorney, Agent, or Firm* — Knobbe, Martens, Olson & Bear, LLP

(57) ABSTRACT

An unloading device includes at least two conveyor belts each extending in a longitudinal direction between an end for receiving bulk material and an end for discharging the bulk material. The receiving end is level with the vehicle. A hopper includes an inlet orifice and at least one outlet orifice for the bulk material. The at least one outlet of the hopper is configured to discharge the bulk material onto the receiving ends of the belt conveyors.

14 Claims, 4 Drawing Sheets

DEVICE FOR UNLOADING A VEHICLE TRANSPORTING BULK MATERIAL, ASSOCIATED ASSEMBLY AND METHOD

CROSS-REFERENCE TO RELATED APPLICATION

This application claims priority to French Patent Application No. 21 06077 filed on Jun. 9, 2021, the disclosure of which including the specification, the drawings, and the claims is hereby incorporated by reference in its entirety.

FIELD OF THE INVENTION

The present invention relates to a device for unloading a vehicle transporting bulk goods.

The invention further relates to an unloading method implementing said unloading device.

BACKGROUND OF THE INVENTION

Bulk materials can be transported by vehicles such as dump trucks. These materials are, for example: aggregates, rubble, sand, wheat, sugar, potatoes, etc.

These materials in some cases must be transferred to storage, for example grain silos or sheds.

It also happens that the materials are transferred to other means of transport, such as barges, boats or other trucks.

These transports can be carried out using unloading devices with a belt conveyor.

The width of the conveyor belt must roughly correspond to the width of the body of the transport vehicle. The implementation of such a band poses difficulties.

In particular, the tape drive drum is subject to a significant force at its center, as it bends in certain cases. Furthermore, beyond a certain width, much less than the typical width of a transport vehicle body, such a conveyor belt is complex to manufacture.

SUMMARY OF THE INVENTION

An object of the invention is therefore to provide an unloading device that does not have the above defects.

To this end, the subject of the invention is a device for unloading a vehicle transporting a bulk material, the device comprising:
- at least two belt conveyors each extending in a longitudinal direction between the receiving end of a bulk material and a bulk material discharge end, the belt conveyors comprising respective conveyor belts located side by side a transverse direction and configured to move in the longitudinal direction from the receiving end to the discharge end, the receiving end being level with the vehicle; and
- a hopper comprising an inlet and at least one outlet of the bulk material, with at least one outlet of the hopper being configured to discharge the bulk material onto the receiving ends of the belt conveyors.

Thus, the unloading device is equipped with several belt conveyors, and not just one. The belt of each conveyor is of moderate width. The drive drums of each band therefore only undergo acceptable stresses, causing no deflection in the center of the drum. These bands, because of their moderate width, do not pose any technical problem for their production.

In addition, the drum driving each band is of a smaller diameter than in the case of a very wide band. The hopper is therefore placed lower. This is advantageous. Indeed in the case of a very wide strip, the diameter of the drum is such that the inlet orifice of the hopper is placed very high. It is necessary to create a ramp so that the rear of the dumpster of the vehicle to be unloaded, reaches a sufficient height to engage in the entry orifice.

According to the invention, the inlet of the hopper is lower, and it is not necessary to provide a ramp for the vehicle to be unloaded. In other words, the receiving end of each conveyor belt is level with the vehicle.

According to particular embodiments, the unloading device of the invention has one or more of the following characteristics, taken separately or according to any technically feasible combination:
- the unloading device comprises exactly two belt conveyors;
- each conveyor belt has a width, measured in the transverse direction, of between 50 cm and 160 cm;
- the hopper comprises an outlet orifice per belt conveyor, each outlet orifice being configured to discharge the bulk material onto the corresponding conveyor belt;
- the hopper comprises an outer wall and an inner partition to the outer wall an inner orifice, forming a restriction limiting the flow of bulk material from the inlet orifice to the or each outlet orifice;
- at least a part of the internal partition is movable relative to the outer wall so as to adjust a passage section of the inlet orifice;
- the inner orifice has a passage section less than 50% of a total section of the outlet orifice(s).

The invention also relates to an assembly comprising a vehicle transporting a bulk material and a device for unloading the vehicle having the above characteristics, the receiving end being level with the vehicle.

The invention also relates to a method for unloading a vehicle transporting a bulk material, the method comprising:
- the supply of an unloading device;
- the unloading of the bulk material transported by the vehicle into the hopper through the inlet;
- the flow of bulk material through the at least one hopper outlet on each conveyor belt at the receiving end of the corresponding belt conveyor;
- the transport of the bulk material on the conveyor belt of each belt conveyor from the receiving end to the discharge end.

BRIEF DESCRIPTION OF THE DRAWINGS

The invention will be better understood on reading the following description, given solely by way of example and made with reference to the appended drawings, among which.

DETAILED DESCRIPTION OF THE PREFERRED EMBODIMENTS

Figure 1:
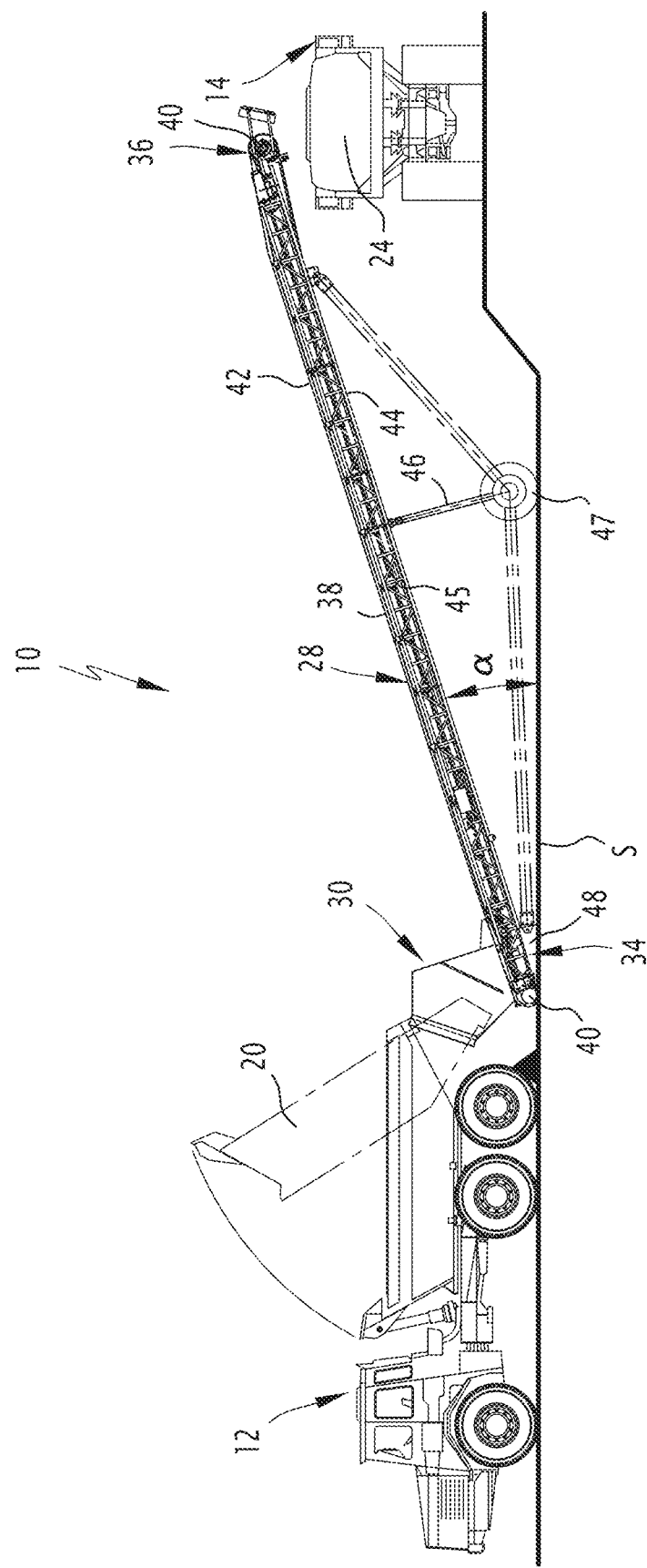
FIG. 1 is a side view of an unloading device according to the invention.

The device 10 illustrated in FIG. 1 is intended to unload a vehicle 12 carrying bulk material.

The bulk material is, for example, aggregates, ore, waste rock, sand, rubble, salt, cereals, potatoes, sugar or any other type of similar material.

The unloading device 10 is arranged to transfer the bulk material into a second transport vehicle 14.

The first vehicle 12 is a dump truck, comprising a dump body 20 containing the bulk material. The body 20 can tilt backwards, to evacuate the bulk material.

The second vehicle 14 is also a dump truck, and includes a second body 24 intended to receive the bulk material.

Alternatively, the unloading device 10 is arranged to transfer the bulk material into storage such as a hangar or a silo. According to another variant, the unloading device 10 is arranged to transfer the bulk material into another type of vehicle, such as a barge, a boat, a train car, etc.

The unloading device 10 comprises at least two belt conveyors 28 and a hopper 30.

Each belt conveyor 28 extends along a longitudinal direction X-X' between an end 34 for receiving the bulk material and an end 36 for discharging the bulk material. The receiving end 34 therefore forms a starting point for the bulk material and the discharge end 36 forms an arrival point for the bulk material.

As illustrated in the example of FIG. 1, the receiving end 34 of the conveyor 28 is located basically at ground level and the discharge end 36 of the conveyor 28 is located high up.

In the example of FIG. 1, the discharge end 36 is located above the body 24.

Each belt conveyor 28 is inclined in the example shown, and forms an angle of approximately 30° with respect to the horizontal line.

The receiving end 34 is level with the vehicle. In other words, the ground under the receiving end 34 is at the same level as the ground under the first vehicle 12, and more precisely under the rear end of the first vehicle 12.

This makes it easier to move the conveyor belt.

In the example of FIGS. 1 to 4, the unloading device 10 comprises exactly two belt conveyors 28.

The belt conveyors 28 comprise respective conveyor belts 38 located side by side in a transverse direction Y-Y' and configured to move in the longitudinal direction X-X' from the receiving end 34 towards the discharge end 36.

Each belt conveyor 28 comprises a single conveyor belt 38.

The conveyor belts 38 are parallel to each other.

The conveyor belts 38 are, for example, flat conveyor belts, that is to say conveyor belts with a flat section. Each conveyor belt 38 then extends substantially in a plane parallel to the longitudinal X-X' and transverse Y-Y' directions.

Alternatively, the conveyor belts have a troughed or substantially closed section, or any other suitable section.

Each conveyor belt has a width, measured in the transverse direction Y-Y', of between 50 cm and 160 cm, for example, preferably between 70 cm and 140 cm, more preferably between 100 cm and 120 cm.

Advantageously, this type of band comprises a matrix made of an elastic material and an armature embedded in the matrix.

The matrix is typically made of synthetic or natural rubber or PVC.

The reinforcement comprises, for example, longitudinal metal cables or an aramid textile part or any other textile having an elongation of between 0.2% and 2%. These cables are typically made of steel and have a very low elongation under load, for example equal to 0.2% to 0.3%. These cables run the full length of each belt 38. They are typically regularly distributed circumferentially in the section of the belt 38 or over a circumferential portion. The reinforcement also comprises, for example, in addition to the longitudinal cables or the equivalent textile, transverse metal cables or a textile part made of aramid or any other textile. These cables are typically made of steel. They typically extend over most of the perimeter of the belt 38. The longitudinal and transverse cables are for example interlaced with each other according to a predetermined frame.

Hereafter a single conveyor belt 38 is described. It should nevertheless be understood that the description applies to all conveyor belts 38.

The belt 38 is typically closed in a loop at its ends, around turning drums 40.

The belt 38 thus comprises a go side 42 for transporting the bulk material and a return side 44, parallel to each other and extending in the longitudinal direction X-X' of the conveyor 28.

Advantageously, cleats, not shown, are formed on the face of the strip facing upwards along the go strand 42. These cleats are transverse. They prevent loose material from sliding down during transport.

In the example shown, the return strand is placed under the outward strand.

The turning drums 40 are arranged at two opposite longitudinal ends of the conveyor 28. The go side 42 and the return side 44 each extend from one turning drum 40 to the other.

Each conveyor 28 comprises, for example, a motor making it possible to move the belt 38 in the longitudinal direction X-X'. For example, at least one turning drum 40 is driven in rotation by a drive motor and itself drives the belt 38. The drive motor is configured to drive the belt 38 in the main direction X-X'.

The turning drum 40 has a diameter of between 100 and 500 mm, preferably between 200 and 400 mm.

Each belt conveyor 28 comprises a plurality of stations 45 (FIG. 2) to support the belt 38, distributed along the belt 38 in a longitudinal direction. These stations include support members such as rollers or pads, arranged under the outward strand and under the return strand.

Each belt conveyor 28 further comprises a frame 46 carrying the support stations 45 and the turning drums 40. The frame 46 is a machine-welded structure, consisting mainly of beams. It rests on the ground through wheels 47, which allows an easy movement of the belt conveyor. It also comprises, under the receiving end 34 of the strip, a shoe 48 resting on the ground.

The hopper 30 is configured to allow the transfer of bulk material from the bucket 20 of the first vehicle 12 onto the belt conveyors 28, in particular onto the conveyor belts 38.

The hopper 30 has an inlet 52 and at least one outlet 54 for the bulk material.

Inlet port 52 communicates with all the outlet ports 54.

The inlet 52 is large. It is sized so that the rear of the bucket 20, in the rearward tilted position, can be received in the inlet 52. In particular, it has a greater transverse width than that of bucket 20.

The at least one outlet port 54 of the hopper 30 is configured to discharge bulk material onto the receiving ends 34 of the belt conveyors 28.

According to the example illustrated in FIGS. 1 to 4, the hopper 30 has one outlet orifice 54 per belt conveyor 28, that is to say two outlet orifices 54.

Each outlet orifice 54 is configured to discharge bulk material onto the receiving end 34 of one of the belt conveyors 28.

Specifically, each outlet orifice 54 is configured to discharge bulk material onto conveyor belt 38 from conveyor 28.

Figure 3:
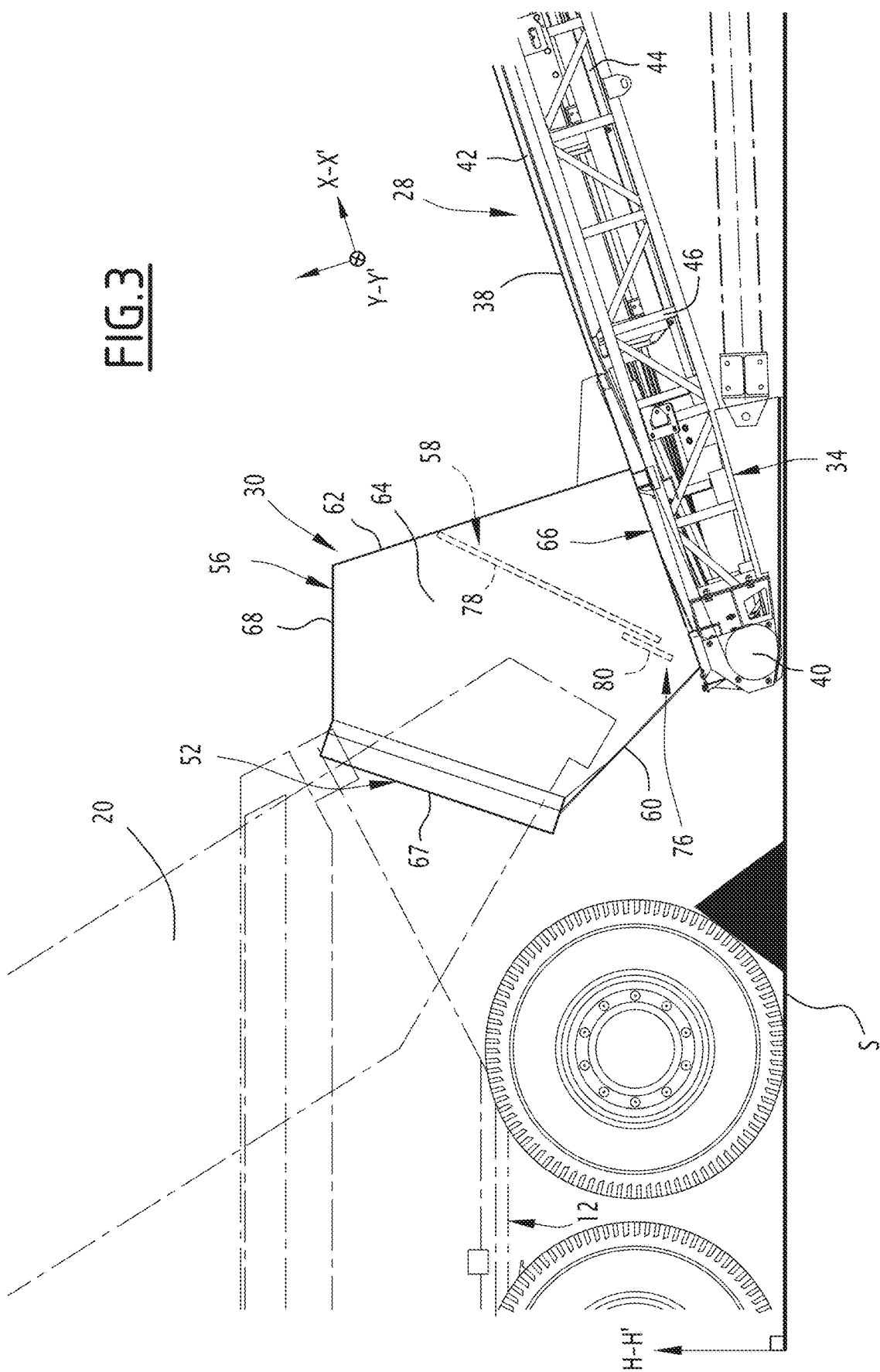
FIG. 3 is a detailed view of the unloading system of FIGS. 1 and 2 in side view.
Figure 4:
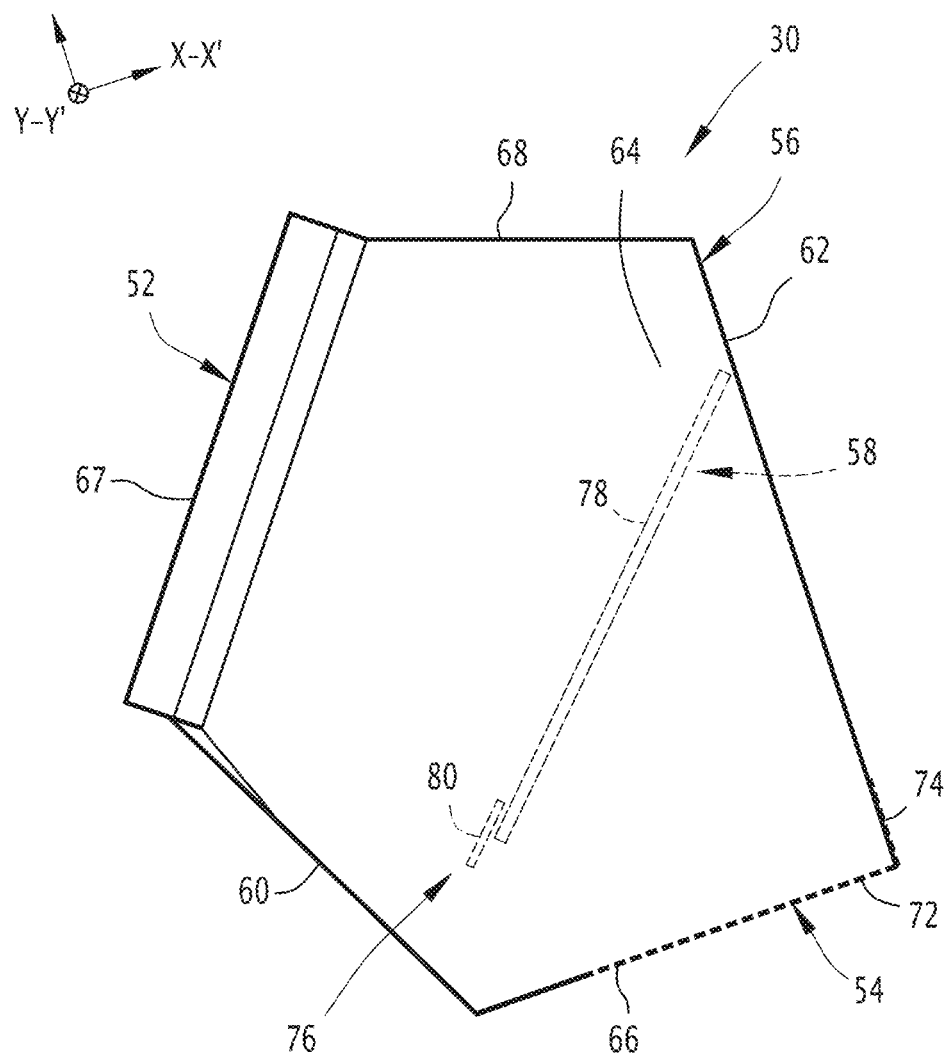
FIG. 4 is a side view of the hopper 30 of the unloading system of FIGS. 1 to 3.

As illustrated in FIGS. 1 and 3, each outlet orifice 54 is flush with the corresponding conveyor belt 38.

The hopper 30 has an outer wall 56 and an internal partition 58.

The outer wall 56 delimits a tubular passage, guiding the bulk material, from the inlet 52 to the at least one outlet 54.

In the example shown, the outer wall 56 comprises a rear wall 60, a front wall 62 opposite the rear wall 60, two side walls 64 substantially orthogonal to the transverse direction Y-Y' and connecting the rear 60 and front 62 walls, and a bottom 66 in which the outlet orifice(s) 54 are formed.

The rear wall 60 is transverse and forms an angle of approximately 45° with the horizontal. Angles are understood here clockwise. It delimits the hopper on a rear side, that is to say along the longitudinal direction X-X' on a side opposite to the direction of movement of the forward side of the conveyor belts.

The front wall 62 is basically transversal and forms an angle of approximately 60° with the horizontal. It delimits the hopper on a front side, that is to say along the longitudinal direction X-X' in the direction of movement of the forward side of the conveyor belts.

The inlet orifice 52 is delimited longitudinally towards the rear by the rear wall 60, longitudinally towards the front by the front wall 62, and laterally by the two side walls 64. It has generally a rectangular shape.

The inlet orifice 52 is open upwards and rearwards. It has a rear zone 67 adjoining the rear wall 60, the normal of which forms an angle of approximately 30° with the horizontal.

It has a front zone 68 adjoining the front wall 62, substantially horizontal.

The bottom 66 closes the hopper 30 downwards. It is connected to the rear wall 60, to the front wall 62 and to the two side walls 64.

It extends in a plane forming an angle of approximately 150° with respect to the horizontal.

The outlet orifices 54 are juxtaposed transversely.

Each outlet orifice 54 comprises a part 72 managed in the bottom 66 and a part 74 managed in the front wall 62.

Part 72 extends longitudinally from rear wall 60 to front wall 62.

Part 72 is located above the receiving end of the conveyor belt served by outlet orifice 54.

The internal partition 58 delimits with the outer wall 56 an inner orifice 76 forming a restriction limiting the flow of bulk material from the inlet 52 to the outlet orifices 54.

Advantageously, at least a part of the internal partition 58 is movable relative to the outer wall 56 so as to adjust a passage section of the inner orifice 76.

The inner orifice 76 thus has a passage section less than 70% of a total section of the outlet orifices 54, preferably less than 50% of this total section; more preferably less than 25% of this total section. The total section here corresponds to the sum of the respective sections of the outlet orifices 54.

Typically, the passage section of the inner orifice 76 is between 5% and 70% of the total section of the outlet orifices 54, preferably between 10% and 50% of the total section;

more preferably between 10% and 25% of the total section.

The internal partition 58 extends over the entire transverse width of the hopper 30, from one side wall 64 to the other. It extends from the front wall 62 towards the rear wall 60.

In the example shown, the internal partition 58 extends from the front wall 62, downwards and towards the rear wall 60.

To vary the passage section of the inner orifice 76, the internal partition 58 advantageously comprises a fixed plate 78 and a movable flap 80.

Plate 78 is integral with outer wall 56, and more particularly with front wall 62.

It is essentially flat.

The flap 80 is mounted on the plate 78 and is movable relative to the plate 78.

For example, it is mounted by a sliding connection, not shown, on the fixed plate.

Flap 80 moves in the plane of plate 78.

The inner orifice 76 is delimited between the flap 80 of the internal partition 58, the rear wall 60 and the side walls 64.

Therefore the flow of bulk material from the inlet 52 to the outlet orifices 54 is regulated by the position of the internal partition 58, and more precisely by the section of the inner orifice 76. The internal partition 58 retains the bulk material in the upper part of the hopper, like if it were an hourglass.

It is thus possible to adjust the flow rate of material flowing through the hopper to an amount substantially equal to the flow rate of bulk material evacuated by the conveyor belt.

This makes it possible to empty the transport vehicle efficiently and very quickly.

In addition, the internal partition 58 makes it possible to limit the pressing force of the bulk material on each conveyor belt 38, which makes it possible to limit the power of the motor driving the conveyor belt.

This also increases the life of each belt conveyor 28.

A method for unloading a vehicle transporting a bulk material, implementing the unloading device 10 described above, will now be detailed.

In the initial state, the bulk material is stored in the bucket 20 of the first vehicle 12.

Figure 2:
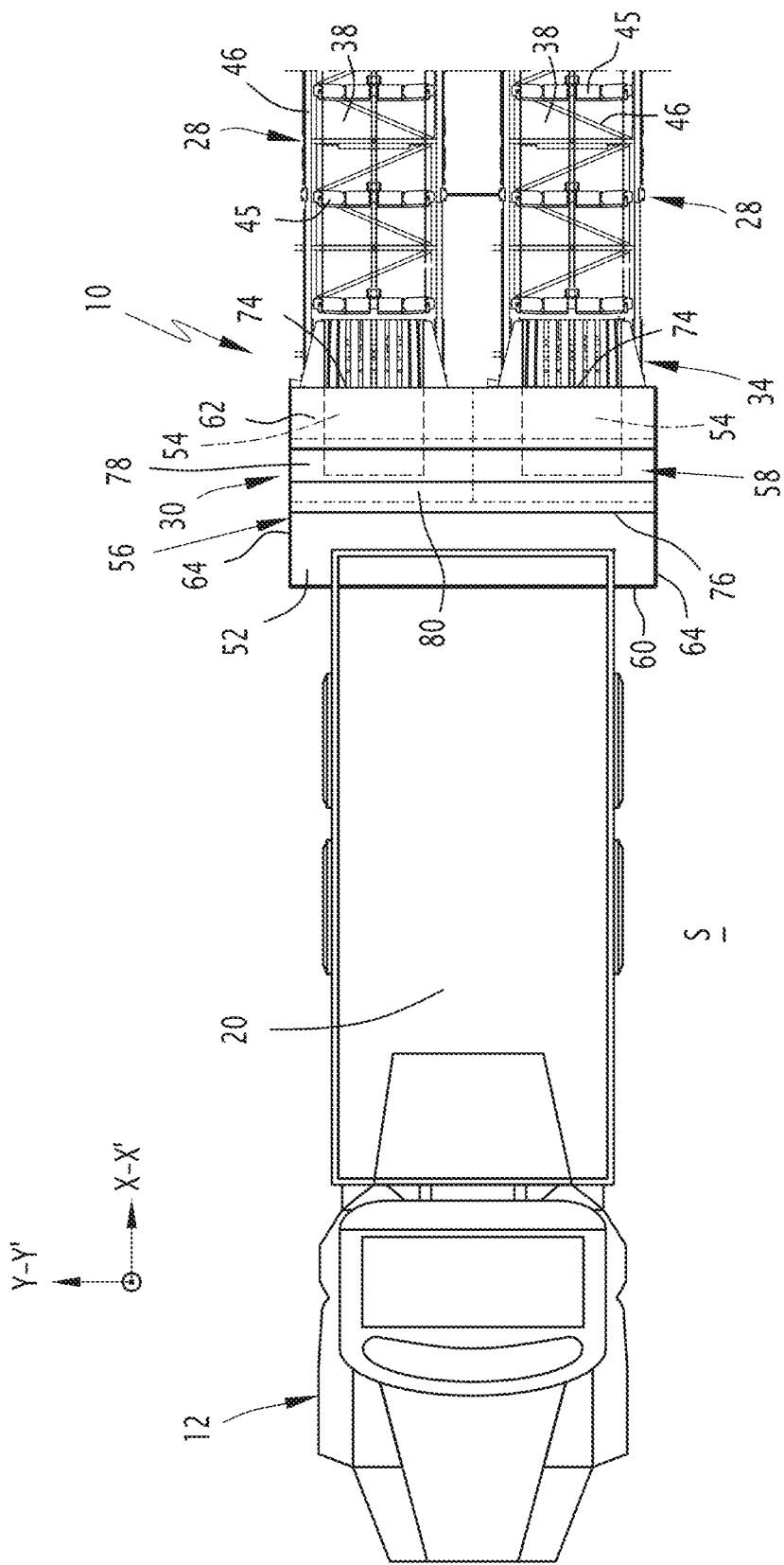
FIG. 2 is a detail view of the unloading system of FIG. 1 in top view, the conveyor belt being shown transparent to reveal the mechanism located below.

As illustrated in FIGS. 1 to 3, the first vehicle 12 is arranged so that the bucket 20 is located opposite the inlet 52 of the hopper 30.

The second vehicle 14 is arranged so that the second bucket 24 is located below the discharge end 36 of each conveyor 28.

The belts 38 of the conveyors 28 are each in constant motion in a longitudinal direction X-X' throughout the unloading process. For example, the turning drum drive motor 40 drives the belt 38 in a longitudinal direction X-X'.

The method then comprises unloading the bulk material carried by the first vehicle 12 into the hopper 30 through the orifice inlet 52.

To do this, the rear of the bucket 20 of the first vehicle 12 is arranged above the inlet, and the bucket 20 is tilted rearwards. The bulk material contained in the bucket 20 flows into the inlet 52 by the effect of gravity.

Inside the hopper 30, under the effect of gravity, the bulk material is directed by the rear wall 60 and by the internal partition 58 towards the inner orifice 76.

As the section of the inner orifice 76 is restricted, the flow of the bulk material is slowed down.

After passing the inner orifice 76, the bulk material flows over the belts 38 of the belt conveyors 28, at the receiving ends 34, from the outlet orifices 54 of the hopper 30. A portion of the bulk material flows through each outlet port 54 of hopper 30 onto each conveyor belt 38.

The bulk material is then transported on the conveyor belt 38 of each belt conveyor 28 from the receiving end 34 towards the discharge end 36 in the longitudinal direction X-X'.

The bulk material is then dumped from discharge end 36 into second bin 24 of the second vehicle 14.

The unloading device 10 and the associated method described above make it possible to unload the bulk material quickly, simply and efficiently, by making it gradually pass over at least two conveyor belts 38 adjacent transversely.

Thanks to this unloading device 10, it is possible to quickly empty the first skip 20 even if the latter has large, in particular transverse, dimensions.

What is claimed is:

1. A device for unloading a vehicle transporting bulk material, the device comprising:
    at least two belt conveyors each extending in a longitudinal direction (X-X') between a bulk material receiving end and a bulk material discharge end, the belt conveyors comprising respective conveyor belts located side by side along a transverse direction (Y-Y') and configured to move in the longitudinal direction (X-X') from the receiving end to the discharge end, the receiving end being level with the vehicle; and
    a hopper comprising an inlet orifice and at least one outlet orifice of the bulk material, the at least one outlet of the hopper being configured to discharge the bulk material onto the receiving ends of the belt conveyors, the hopper having one outlet orifice per belt conveyor, each outlet orifice being configured to discharge bulk material on the corresponding conveyor belt, the hopper guiding the bulk material from the inlet orifice to each outlet orifice.

2. The unloading device according to claim 1, comprising two said belt conveyors.

3. The unloading device according to claim 1, wherein each conveyor belt has a width, measured in the transverse direction (Y-Y'), of between 50 cm and 160 cm.

4. The unloading device according to claim 1, wherein the hopper comprises an outer wall and an internal partition bordering the outer wall an inner orifice forming a restriction to restricting the flow of bulk material from the inlet orifice port to the or each outlet orifice port.

5. The unloading device according to claim 4, wherein at least a part of the internal partition is movable with respect to the outer wall so as to adjust a passage section of the inner orifice.

6. The unloading device according to claim 4, in which the inner orifice has a passage section less than 50% of a total section of the outlet orifice(s).

7. The unloading device according to claim 4, wherein the hopper comprises an outer wall comprising a rear wall, a front wall opposite the rear wall, two side walls substantially orthogonal to the transverse direction (Y-Y') and connecting the rear and front walls, and a bottom, the internal partition comprising a fixed plate and a movable flap, the fixed plate being integral with the outer wall, and more particularly with the front wall, the inner orifice being delimited between the movable flap of the internal partition, the rear wall and the side walls.

8. The unloading device according to claim 7, wherein the movable flap is mounted by a sliding connection on the fixed plate and is movable relative to the plate in the plane of the fixed plate.

9. The unloading device according to claim 7, wherein the internal partition extends over the entire transverse width of the hopper, from one side wall to the other, from the front wall towards the rear wall.

10. An assembly comprising a vehicle carrying bulk material and the unloading device according to claim 1, the receiving end being level with the vehicle.

11. A method for unloading a vehicle carrying bulk material, the method comprising:
    providing the unloading device according to claim 1;
    unloading the bulk material transported by the vehicle into the hopper through the orifice inlet;
    conveying the bulk material through the at least one outlet of the hopper onto each conveyor belt at the receiving end of the corresponding belt conveyor;
    transporting bulk material on the conveyor belt of each belt conveyor from the receiving end to the discharge end.

12. The unloading device according to claim 1, wherein the hopper comprises an outer wall comprising a rear wall, a front wall opposite the rear wall, and a bottom, the outlet orifices being formed in the bottom and being separated from each other by a solid area of the bottom.

13. The unloading device according to claim 1, wherein the outlet orifices comprise a part managed in the bottom and a part managed in the front wall.

14. A device for unloading a vehicle transporting bulk material, the device comprising:
    at least two belt conveyors each extending in a longitudinal direction (X-X') between a bulk material receiving end and a bulk material discharge end, the belt conveyors comprising respective conveyor belts located side by side along a transverse direction (Y-Y') and configured to move in the longitudinal direction (X-X') from the receiving end to the discharge end, the receiving end being level with the vehicle; and
    a hopper comprising an inlet orifice and at least one outlet orifice of the bulk material, the at least one outlet of the hopper being configured to discharge the bulk material onto the receiving ends of the belt conveyors, the hopper comprising an outer wall and an internal partition bordering the outer wall, an inner orifice forming a restriction to restricting the flow of bulk material from the inlet orifice port to the or each outlet orifice port, the internal partition comprising a fixed plate and a movable flap, the movable flap being movable with respect to the outer wall so as to adjust a passage section of the inner orifice.

\* \* \* \* \*